Oct. 4, 1932.  E. WANAMAKER  1,880,546
OIL DRAINAGE COLLECTING APPARATUS
Filed Dec. 19, 1929
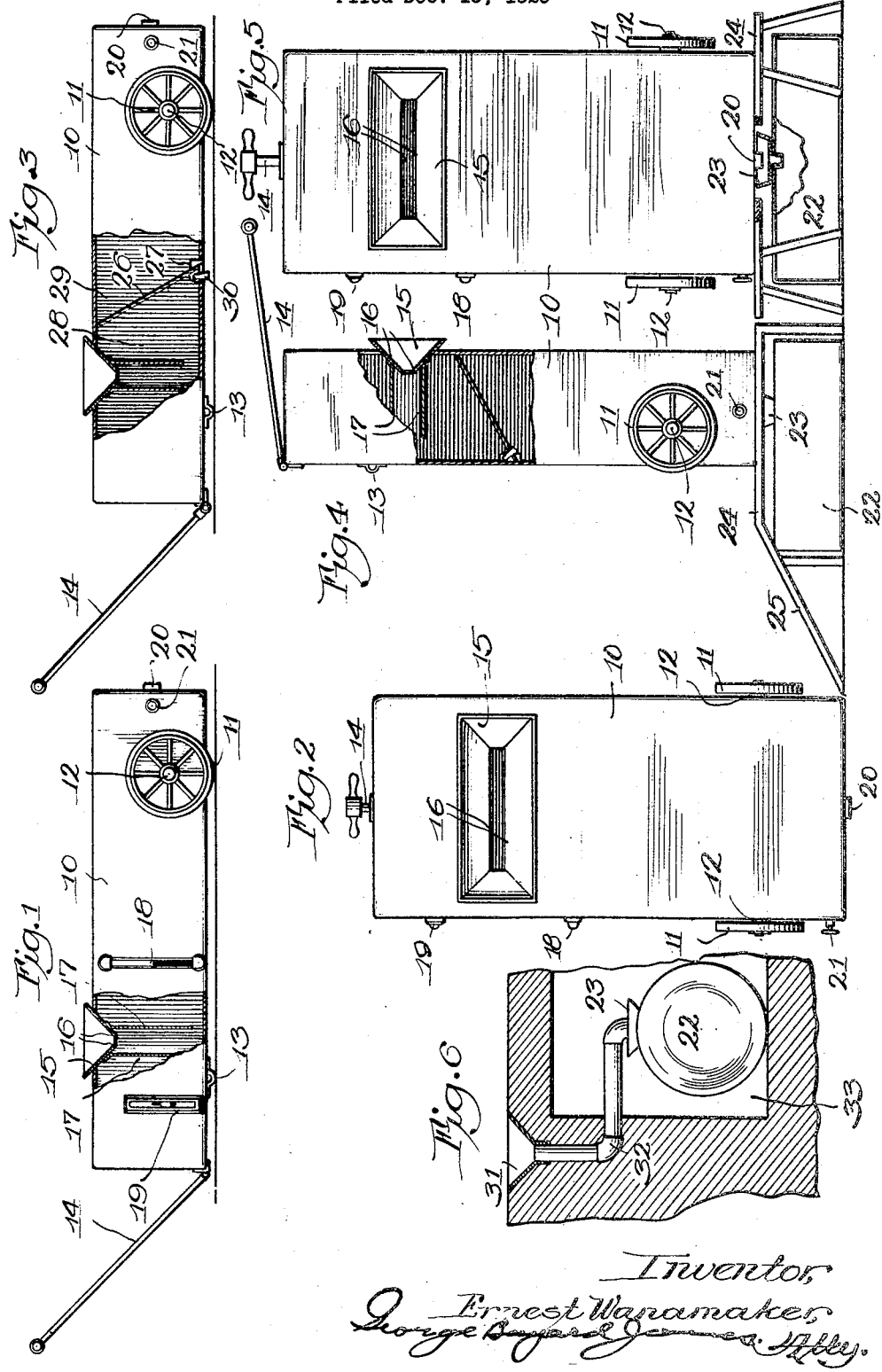

Patented Oct. 4, 1932

1,880,546

UNITED STATES PATENT OFFICE

ERNEST WANAMAKER, OF CHICAGO, ILLINOIS, ASSIGNOR TO U. S. OIL AND SERVICE CO., OF NEW YORK, N. Y., A CORPORATION OF NEW YORK

OIL DRAINAGE COLLECTING APPARATUS

Application filed December 19, 1929. Serial No. 415,329.

This invention relates to improvements in oil drainage collecting apparatus.

One object of the invention is to provide apparatus for collecting oil drained from crank cases of internal combustion engines which apparatus can be pushed beneath the crank case of an automobile engine, for instance, when the vehicle is standing on a floor or other comparatively level surface, thereby obviating the need of so called drainage or greasing pits and also expensive hydraulic apparatus by means of which the vehicle is elevated to give the attendant access to the lower portion of the vehicle.

Another object of the invention is to provide a collecting apparatus which can be manufactured at a cost only a very small fraction of the cost of a pit or hydraulic hoist and which can be transported readily by the attendant from one vehicle to another without moving the latter from their positions, as in a parking area for instance.

By the use of the present improvements crank case service can be rendered expeditiously and without large initial investment, thus opening up this field of service to many not financially able to provide the equipment generally in use at the present time.

This invention constitutes a part of a more elaborate system of collecting drainage oil, and transporting it in containers to a purifying station where the oil will have the gasoline or other diluents and foreign matter extracted and the oil so processed that its lubricating qualities will be restored or improved, and the oil thus rendered available for further crank case or related service.

A further object of the present invention, therefore, relates to the provision of means for removing the oil from the collecting apparatus and storing it in containers ready for transportation to the purifying station above mentioned.

Other objects relate to various features of construction and arrangement of parts of apparatus embodying the present improvements, which will be apparent from a consideration of the following specification and accompanying drawing, wherein, Fig. 1 is a broken side elevation of collecting apparatus embodying the present improvements.

Fig. 2 is a top plan view thereof.

Fig. 3 is a broken side elevation in a modified form of the invention.

Fig. 4 is a side elevation showing the collector in discharging position.

Fig. 5 is a view of the top of the collector while in discharging position.

Fig. 6 is a view of a modification in which the oil collector is located in a pit.

In the drawing, the collector is shown as comprising a casing or receptacle 10, preferably of sheet metal, and of a height to permit it to be moved under an automobile for collecting the oil drained from the engine crank case. The collector is provided with wheels 11, which may be mounted on trunnions 12 secured to the outer wall of the collector at such height as to permit only a slight clearance beneath the bottom of the casing 10 and the floor. A support 13 may be positioned adjacent the forward end of the casing to maintain the collector 11 level during the drainage of the oil. A handle 14 is provided at the forward end of the collector for manually conveying the collector from car to car or to the dumping platform hereinafter referred to.

In the form of the invention shown in Figs. 1 and 2, the casing 10 is provided with a transversely disposed funnel 15 which in use is positioned under the outlet of the crank case for receiving oil drained therefrom. It is preferred to have the lower transverse edges 16 of the funnel rather close together to prevent the spilling of the oil through the funnel during transportation of the collector, since the apparatus may be used over uneven surfaces such as on the ground at service stations. It is desirable to provide baffles 17 which depend downwardly into the casing to points near the bottom of the receptacle as a further safeguard against the splashing of the oil outwardly through the funnel. These baffles may be secured to the transverse inclined walls of the funnel 15 by any approved means, as by riveting or welding. The collector is provided with a gauge 18 mounted on the exterior of the tank 10 to indicate the level of the oil therein. A hydrometer 19 may likewise be secured to an outer wall of the tank for indicating the specific gravity of the drainage. By use of the gauge 18 the attendant can determine the amount of oil drained from each crank case, the gauge preferably being graduated for this purpose.

The rear end of the tank is provided with an outlet port 20 which is controlled by a valve 21 whereby when the tank 10 is up-ended the entire contents can be drained out.

In carrying out the general method of oil collection referred to above, suitable drums will be provided into which the oil can be poured from the collectors, such a drum being indicated at 22 in Figs. 4 and 5. These drums preferably will be cylindrical, and have side openings into which a funnel member 23 may be inserted. The drum is positioned under a suitable support or platform 24 having an inclined trackway 25 up which the collector may be moved. When upon the platform 24, the collector may be inclined or up-ended, as shown in Figs. 4 and 5, the valve 21 opened, and the oil drained into the drum.

In the form of the invention shown in Figs. 3, 4 and 5, the general construction of the parts is as above described with the exception that the tank 10 is provided with a transverse partition 26, the lower edge of the partition being farther removed from the forward end of the tank than the upper edge. A valve 27 which provides a passage from the forward receiving chamber 28 to the rear reservoir chamber 29 is provided with an exterior operating handle 30. When the valve 27 is closed the oil drained into the receiving chamber 28 will be confined therein until the quantity can be gauged and its specific gravity noted, if desired. The tank 10 may then be pulled upwardly sufficiently on its rear end, and the valve 27 opened, which will permit the oil in compartment 28 to pass through the opening of the valve 27 into the reservoir compartment 29 after which the valve is again closed. By this construction the specific gravity and quantity of the oil drained from the crank case can be determined for the purpose of making an allowance to the customer.

This construction is also useful in enabling the attendant to more or less accurately classify the various batches of oil drained, that is, if the instruments on the collector show that a batch drained into the receiving compartment 28 is very inferior to the oil in the reservoir 29, the two batches need not be mixed but may be placed in separate drums for the purpose of giving the various batches different treatments at the reclaiming plant.

In some instances, as illustrated in Fig. 6, the platform 24 may be dispensed with and a receptacle 31 may be positioned at ground or floor level from which extends a pipe 32 which terminates in a basement or pit 33. The oil is poured into the receptacle 31 by up-ending the drainage collector, as previously described, and is collected in drums 22 in the basement. This installation is more permanent, or fixed, as compared with the use of the platform 24, and may be employed in instances where the basement space is available or where the business warrants this type of installation.

Although I have shown and described certain features of my improvements for the purposes of illustration, I do not wish to be restricted specifically thereto except as so limited by the appended claims.

What I claim is:

1. A portable liquid receptacle having a partition therein dividing the receptacle into two compartments, one of said compartments having an inlet port and the other an outlet port, and a valved passage between said compartments whereby the flow of the liquid from the inlet compartment to the other compartment can be effected for confining all the liquid in the latter upon the tilting of said receptacle to elevate the inlet compartment end thereof.

2. A portable liquid receptacle comprising a casing having an inclined partition therein dividing the casing into a receiving and a reservoir compartment, said reservoir compartment having an outlet port adjacent its outer end, said partition being provided with a liquid transfer passage adjacent the edge thereof which is lower-most when said receptacle is tilted upon said outer end, whereby the contents of said receiving compartment can be transferred to said reservoir compartment, and a valve for said transfer passage having an operating handle on the exterior of said casing.

3. A portable liquid receptacle comprising a casing having a partition therein dividing the interior thereof into a receiving-gauging compartment and a reservoir compartment of larger capacity, said receiving compartment being provided with an inlet port, said partition having a transfer passage through which successive gauged quantities of liquid from said receiving compartment can be discharged into said reservoir compartment, a valve for said passage having an operating handle on the exterior of said casing, and an outlet for said reservoir compartment for draining the liquid therefrom.

4. A portable liquid receptacle comprising a casing having a transverse partition therein dividing the interior thereof into a receiving compartment and a reservoir compartment arranged end to end, said receptacle having a transfer passage between said compartments whereby successive quantities of liquid can be discharged from said receiving compartment to said reservoir compartment upon tilting said receptacle to elevate said receiving compartment over said reservoir compartment.

5. A portable liquid receptacle comprising a casing having a transverse partition therein dividing the interior thereof into a receiving compartment and a reservoir compartment arranged end to end, said receptacle having a transfer passage between said compartments whereby successive quantities of liquid can be discharged from said receiving compartment to said reservoir compartment upon tilting said receptacle to elevate said receiving compartment over said reservoir compartment, the outer end of said reservoir compartment being provided with a discharge port for the removal of the contents thereof.

In testimony whereof, I have subscribed my name.

ERNEST WANAMAKER.